United States Patent
Hiramoto et al.

(10) Patent No.: US 7,206,658 B2
(45) Date of Patent: Apr. 17, 2007

(54) MACHINING CENTER THAT ROTARY DRIVE A TOOL PRIOR TO PROCESS POSITIONING AT A WORKING POSITION

(75) Inventors: Kazuyuki Hiramoto, Yamatokoriyama (JP); Zack Piner, Yamatokoriyama (JP); Kyle Konishi, Yamatokoriyama (JP); Takahiro Kobi, Yamatokoriyama (JP); Jiancheng Liu, Yamatokoriyama (JP); Hiroki Nakahira, Yamatokoriyama (JP)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 0 days.

(21) Appl. No.: 10/938,869

(22) Filed: Sep. 13, 2004

(65) Prior Publication Data

US 2005/0096778 A1 May 5, 2005

(30) Foreign Application Priority Data

Sep. 12, 2003 (JP) ............................. 2003-321911
Sep. 12, 2003 (JP) ............................. 2003-321912
Sep. 12, 2003 (JP) ............................. 2003-322161

(51) Int. Cl.
*G06F 19/00* (2006.01)

(52) U.S. Cl. .................................................. 700/179

(58) Field of Classification Search ................ 700/159, 700/160, 169, 170, 179, 186, 192, 193, 185; 483/13–15, 17–19, 30–32, 39, 42
See application file for complete search history.

(56) References Cited

U.S. PATENT DOCUMENTS

| | | | | |
|---|---|---|---|---|
| 3,803,978 A | * | 4/1974 | Plevyak | ...................... 409/240 |
| 4,090,281 A | * | 5/1978 | Hautau | ........................... 29/40 |
| 4,656,708 A | * | 4/1987 | Smith et al. | ................... 29/40 |
| 4,872,244 A | * | 10/1989 | Schleich | ......................... 29/40 |
| 4,922,595 A | * | 5/1990 | Hattori et al. | ................. 29/40 |
| 5,191,817 A | * | 3/1993 | Matsukuchi et al. | ......... 82/1.11 |
| 5,720,090 A | * | 2/1998 | Dawson, Jr. | ................... 29/40 |
| 5,842,259 A | * | 12/1998 | Hardesty et al. | ......... 29/48.5 A |
| 5,918,514 A | * | 7/1999 | Crudgington et al. | ......... 82/129 |
| 6,237,212 B1 | * | 5/2001 | Speller et al. | ............. 29/524.1 |
| 6,240,332 B1 | * | 5/2001 | Buttrick et al. | ............. 700/169 |
| 6,628,097 B2 | * | 9/2003 | Endo et al. | ................. 318/569 |
| 6,722,005 B2 | * | 4/2004 | Sauter et al. | ................... 29/40 |
| 6,785,943 B2 | * | 9/2004 | Sheehan et al. | ............... 29/40 |
| 6,807,887 B2 | * | 10/2004 | Babuder et al. | .............. 82/129 |
| 6,815,917 B2 | * | 11/2004 | Fujinawa | .................... 318/560 |
| 6,925,694 B2 | * | 8/2005 | Sauter et al. | ................... 29/40 |
| 6,928,909 B1 | * | 8/2005 | Akimoto et al. | .............. 82/129 |
| 2002/0083567 A1 | * | 7/2002 | Speller et al. | .............. 29/34 B |

FOREIGN PATENT DOCUMENTS

JP      6-134640 A    5/1994
JP      9-529 U    1/1997

* cited by examiner

*Primary Examiner*—M. N. Von Buhr
(74) *Attorney, Agent, or Firm*—Smith Patent Office

(57) ABSTRACT

There is provided a machining center capable of simplifying a driving force transmitting mechanism and restraining occurrence of noise and vibration. A machining center having a turret head 20 with a plurality of tools on a turret base 5 includes one tool drive motor for each tool, the tool drive motor rotary driving the corresponding tool independently.

7 Claims, 6 Drawing Sheets

MACHINING CENTER THAT ROTARY DRIVE A TOOL PRIOR TO PROCESS POSITIONING AT A WORKING POSITION

BACKGROUND OF THE INVENTION

1. Field of the Invention

The present invention relates to a machining center having a turret head with a plurality of tools.

2. Description of the Related Art

A machining center having a turret head to which a plurality of tools are fitted has a structure such that a desired tool is indexed to a processing position by rotating the turret head, and processing of a work is performed with the tool (for example, refer to Japanese Patent Application Laid-open No. Hei 6-134640, Japanese Utility Model Application Laid-open No. Hei 9-529).

In this type of turret head, it is common that all tools are rotary driven by one drive source via a driving force transmitting mechanism constituted of belts, gears, and so on.

Further, it is common that after processing with a tool that is indexed to a processing position is completed, a tool for the next step is rotary indexed to the processing position, and the tool for the next step is rotary driven to perform the next processing on a work.

SUMMARY OF THE INVENTION

Meanwhile, in the case where the structure to rotary drive all tools by one drive source via belts, gears, and so on as described above is adopted, there are concerns such as complication of the structure of the driving force transmitting mechanism and occurrence of noise and vibration.

Further, in the case where a tool for the next step is indexed to a processing position and processing of a work is performed by activating the tool for the next step as described above, there is a problem that the time from rotary activating the tool for the next step to starting the processing becomes a loss, and it makes the entire processing time longer accordingly.

Here, in order to avoid the problems of complication of the driving force transmitting structure, noise, vibration or the like as described above, it is considered to be effective to rotary drive each tool independently by providing a tool drive motor for each tool. However, when a structure of providing the tool drive motor for each tool is adopted, an amplifier (drive circuit) for rotary driving the tool drive motor should be provided to each motor, so that a possibility of increasing the cost arises.

An object of the present invention is to provide a machining center capable of simplifying a driving force transmitting mechanism and restraining occurrence of noise and vibration.

Another object of the present invention is to provide a machining center capable of shortening processing time by eliminating a loss of time from rotary activating a tool for the next step to starting the processing.

Still another object of the present invention is to provide a machining center capable of restraining a cost increase in the case where a tool drive motor is provided for each tool.

In a first invention, a machining center having a turret head with a plurality of tools includes one tool drive motor for each tool, the tool drive motor rotary driving the corresponding tool independently.

In the machining center according to the present invention, one tool drive motor is provided for each tool, and each tool is rotary driven independently, so that each tool can be rotary driven directly by the tool drive motor, which eliminates the need of a driving force transmitting mechanism using belts, gears, and so on. Therefore, the structure of the drive unit can be simplified, and the occurrence of noise and vibration can be restrained.

In one preferred embodiment of the first invention, the machining center further includes a processing control unit configured to rotary drive a tool for a next step while a tool in a processing step is rotary driven, and to index the turret head so that the tool for the next step is located at a processing position to thereby perform processing in the next step.

In this embodiment, since the tool for the next step is rotary activated while the tool in the processing step is rotary driven, and the tool for the next step is indexed to the processing position to perform the processing in the next step, the processing can be started substantially at the same time when the tool for the next step is indexed to the processing position. Therefore, the loss until the start of processing with the tool for the next step can be eliminated, and the processing time can be shortened accordingly.

In another preferred embodiment of the first invention, the processing control unit controls the rotation speed of the tool for the next step to reach a rotation speed for processing while the tool in the processing step is rotary driven.

In this embodiment, since the rotation speed of the tool for the next step reaches the rotation speed for processing while the tool in the processing step is rotary driven, processing with the tool for the next step can be started as soon as the processing with the tool in the processing step is completed, the processing time can be shortened further.

In another preferred embodiment of the first invention, the machining center further includes a first drive circuit configured to rotary drive a first tool drive motor among the tool drive motors, a second drive circuit configured to rotary drive a second tool drive motor among the tool drive motors except the first tool drive motor, and a processing control unit configured to rotary drive a tool drive motor in a processing step and a tool drive motor for a next step by sequentially switching the tool drive motors driven by the first and second drive circuits.

In this embodiment, since the tool drive motor in the processing step and the tool drive motor for the next step are rotary driven by sequentially switching the tool drive motors driven by the first and second drive circuits, sequential processing can be performed only by the two drive circuits which drive the tool drive motor in the processing step and the tool drive motor for the next step, and thus the cost can be reduced as compared to the case where the drive circuit is provided for each drive motor.

DETAILED DESCRIPTION OF THE PREFERRED EMBODIMENTS

Hereinafter, embodiments of the present invention will be described based on the attached drawings.

Figure 1:
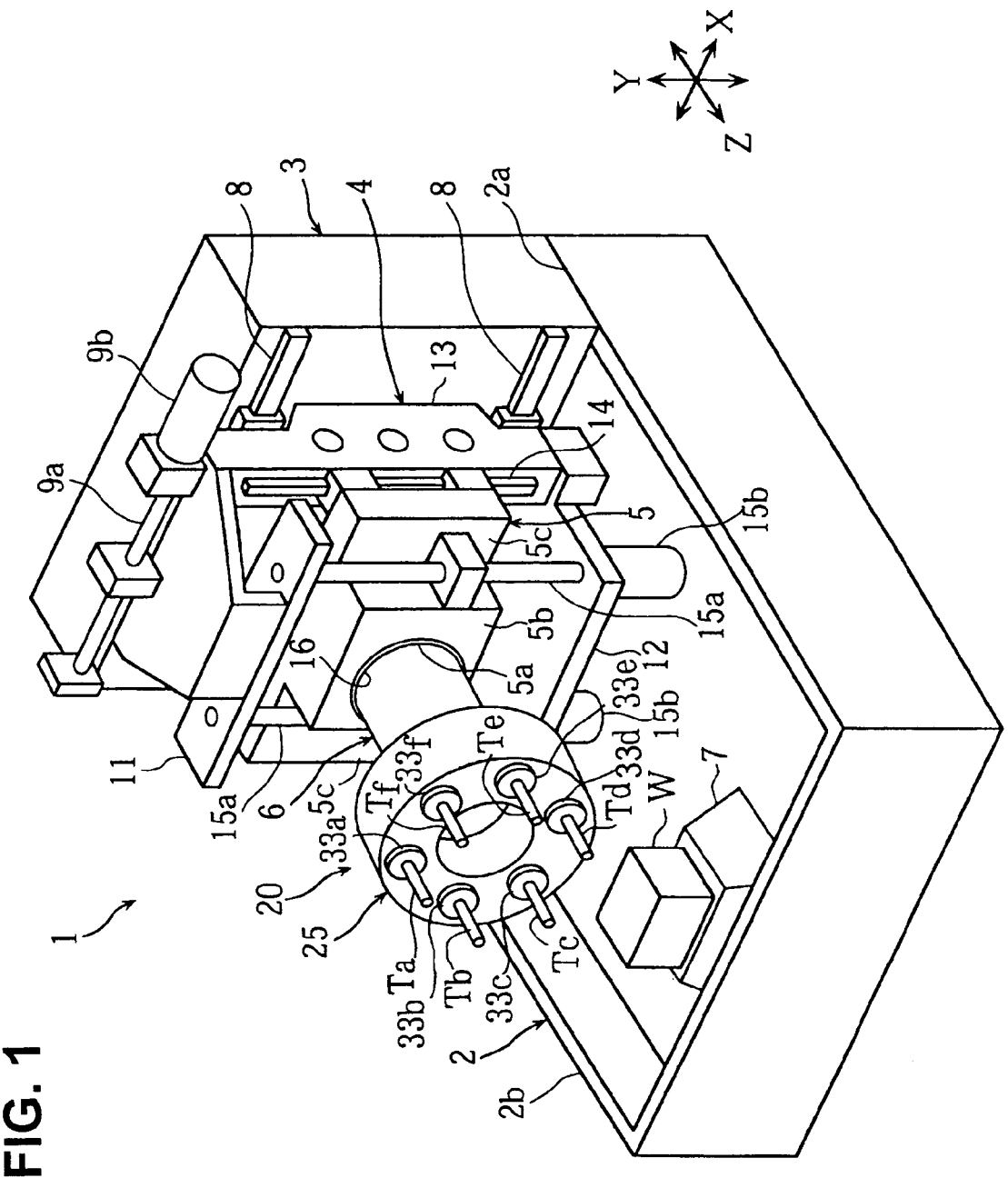
FIG. 1 is a perspective view for describing a horizontal machining center according to an embodiment of the present invention.
Figure 2:
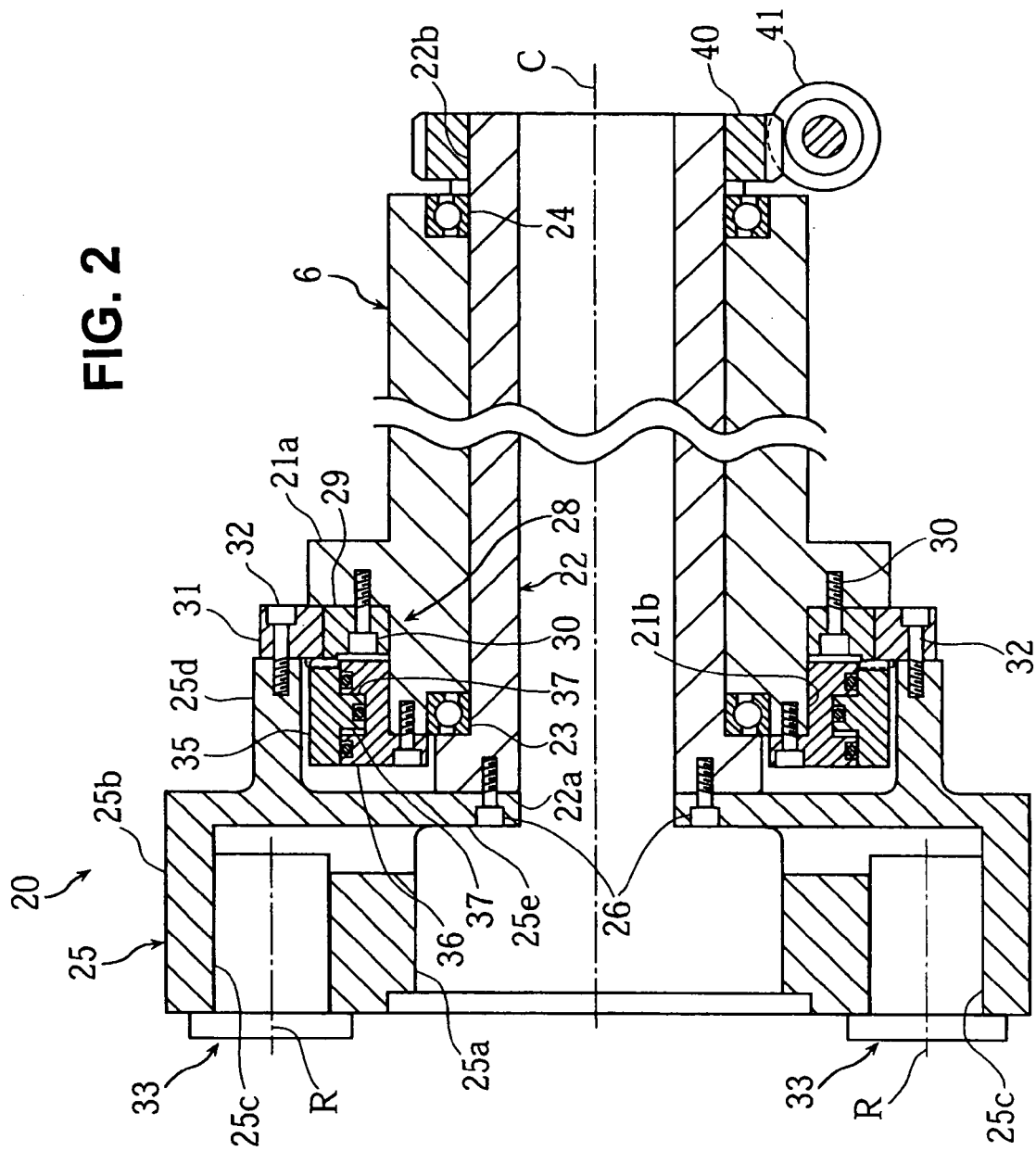
FIG. 2 is a cross-sectional view of a turret head of the horizontal machining center.
Figure 3:
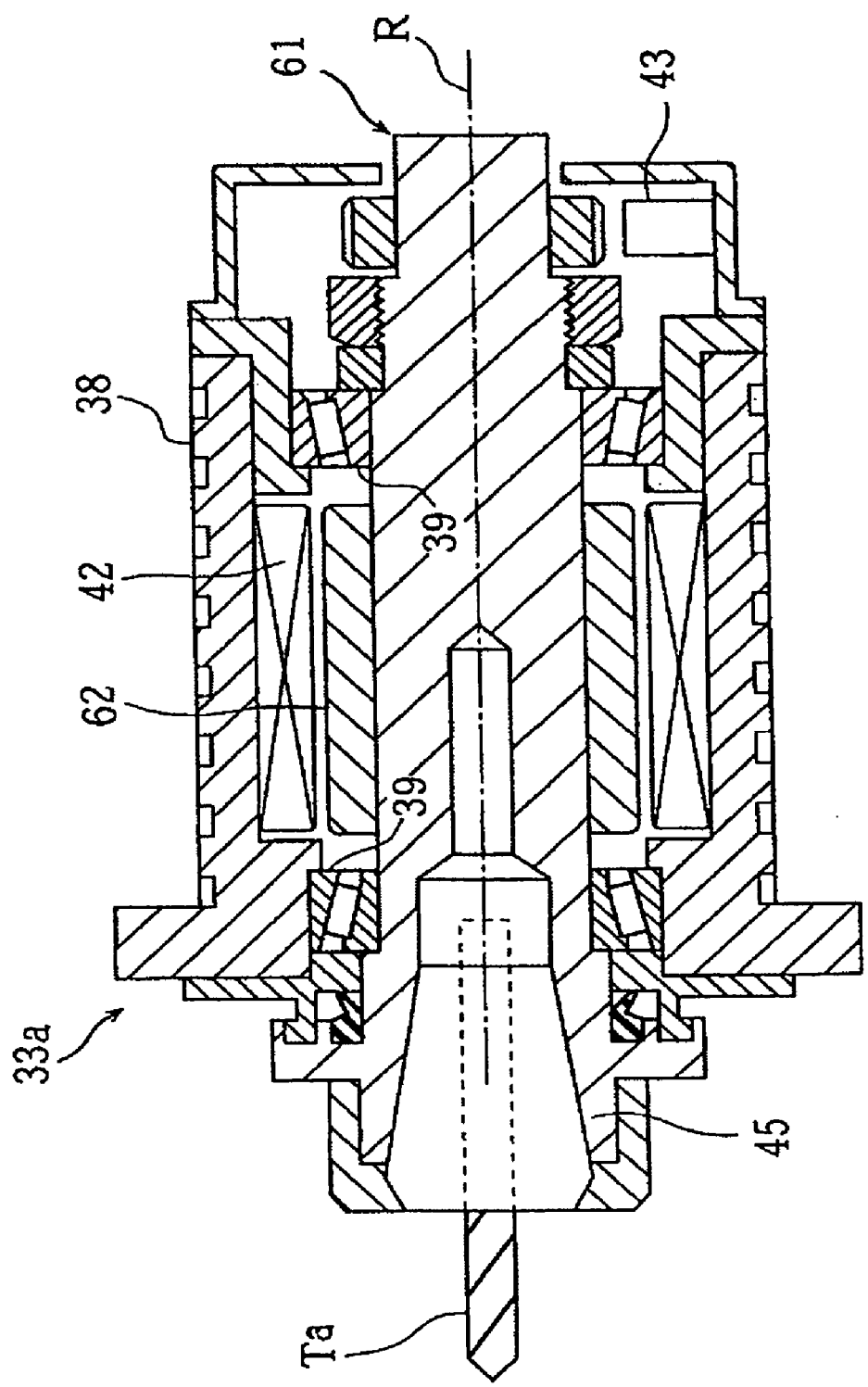
FIG. 3 is a cross-sectional view of a tool drive motor disposed on the turret head.

FIG. 1 to FIG. 5 are views for describing a machining center according to an embodiment of the present invention. FIG. 1 is a perspective view of a horizontal machining center, FIG. 2 is a cross-sectional view of a turret head, FIG. 3 is a cross-sectional view of a tool drive motor, FIGS. 4(*a*), 4(*b*) and FIGS. 5(*a*), 5(*b*) are control block diagrams of the tool drive motor.

In the drawings, "1" denotes a horizontal machining center, which is of a desktop type having vertical and horizontal lengths of approximately from 500 mm to 800 mm and a processing stroke of approximately 150 mm in X axis, Y axis and Z axis directions.

The machining center 1 has a schematic structure such that, when seen from the front of the machine, a column 3 extending perpendicularly upward is attached to a rear end portion 2*a* of a fixed bed 2 in a box shape having a bottom, a saddle 4 is supported by the column 3 to be movable in a left and right (X axis) direction, a turret base 5 is supported by the saddle 4 to be movable in an up and down (Y axis) direction, and a quill 6 is supported by the turret base 5 to be movable in a forward and backward (X axis) direction. On a front end portion 2*b* of the fixed bed 2, a table 7 on which a work W is mounted is disposed.

The column 3 is formed in a rectangular frame shape having an opening on a center portion thereof. A pair of upper and lower guide rails 8, 8 are disposed on the front surface of the column 3, and the saddle 4 is supported by the respective guide rails 8 to be movable in the X axis direction. The saddle 4 is reciprocated by a ball screw 9*a* and a servomotor 9*b* which are disposed on the top surface of the column 3.

The saddle 4 is formed in a frame shape having an opening on a center portion by connecting an upper base 11 and a lower base 12 by left and right support posts 13, 13. On the front surfaces of the left and right support posts 13, guide rails 14 are disposed, and by the left and right guide rails 14, the turret base 5 are supported to be movable in the Y axis direction. The turret base 5 is reciprocated by left and right ball screws 15*a*, 15*a*, which are supported by the upper and lower bases 11, 12, and servomotors 15*b*, 15*b*.

The turret base 5 has a structure such that flange portions 5*c*, 5*c* are formed on the left and the right of a base main body 5*b* that is formed in a substantially rectangular parallelepiped shape extending rearward through the openings of the saddle 4 and the column 3. A sliding hole 5*a* is formed in the axial core of the base main body 5*b* of the turret base 5, and inside the sliding hole 5*a*, the quill 6 is inserted to be slidable in the Z axis direction and non-rotatable. The space between the quill 6 and the sliding hole 5*a* is sealed by a seal member 16. The quill 6 is in a cylindrical shape and having a length covering substantially the entire length of the base main body 5*b* of the turret base 5, and is reciprocated by a not-shown ball screw and servomotor disposed on the rear side of the column 3.

A turret head 20 is attached to a front end portion of the quill 6. The turret head 20 has a cylindrical turret shaft 22 inserted into the quill 6 and rotatably supported via bearings 23, 24 and a turret main body 25 fastened and fixed to the front end surface 22*a* of the turret shaft 22 by plural bolts 26 in a detachable manner.

The turret main body 25 has a structure such that plural motor mounting holes 25*c* are formed at predetermined angular intervals on an outer peripheral portion of a circular drum main body 25*b* having a recessed portion 25*a* in its axial core, and a bottom wall portion 25*e* of the drum main body 25*b* is attached to the turret shaft 22 by the bolts 26 inserted via the recessed portion 25*a*. Further, a flange portion 25*d* in a cylindrical shape projecting rearward is formed on the bottom wall portion 25*e*.

Tool drive motors 33*a* to 33*f* are attached to the respective motor mounting holes 25*c* so that the rotation axis R of them becomes parallel with a quill axis C. Each of the tool drive motors 33*a* to 33*f* has a structure such that a rotation shaft 61 is inserted in a rotatable and axially unmovable manner via bearings 39, 39 into a housing 38 fixed to the drum main body 25*b*, a rotor 62 is arranged on the outer peripheral surface of the rotation shaft 61, and a stator 42 is arranged on the inner peripheral surface of the housing 38 so as to oppose the rotor 62. A sensor 43 is used to detect the rotation speed and the rotation angle of the rotation shaft 61.

A collet 45 to which one of tools Ta to Tf is attached is fixed by tapering engagement to the rotation shaft 61 of each of the tool drive motors 33*a* to 33*f*. Each of the tools Ta to Tf is arranged to be located on a circumference, whose center coincides with the quill axis C, on the turret main body 25 and to be parallel with the quill axis C.

Thus, the tool drive motors 33*a* to 33*f* are provided for each tool, and are configured to rotary drive each of the tools Ta to Tf independently.

A rotary indexing mechanism 28 for rotary indexing and positioning a desired tool T to a predetermined processing position around the quill axis C is disposed on the turret head 20, and the rotary indexing mechanism 28 has the following structure.

An annular fixed-side coupling 29 is fastened and fixed by bolts 30 to an outer peripheral flange portion 21*a* formed on the front end portion of the quill 6. An annular turning-side coupling 31 is arranged coaxially outside the fixed-side coupling 29, and the turning-side coupling 31 is fastened and fixed by bolts 32 on the flange portion 25*d* of the turret main body 25.

Between the flange portion 25*d* and a portion in front of the outer peripheral flange portion 21*a* of the quill 6, an annular coupling 35 having a cross-section in a projecting shape is arranged in a manner capable of axially advancing/ retracting between an engagement position for engaging with both the fixed-side and turning-side couplings 29, 31 and an engagement release position for releasing the engagement with both the couplings 29, 31.

This coupling 35 is supported in a manner capable of engaging with a cylinder member 36 having a cross-section in a recessed shape, which is fastened and fixed by bolts on the front end portion 21*b* of the quill 6, and driven to axially advance/retract by supplying an oil pressure to the oil pressure rooms 37, 37 formed by the coupling 35 and the cylinder member 36.

A worm wheel 40 is fixed on a rear end portion 22*b* of the turret shaft 22, and a worm gear 41 rotary driven by a not-shown rotary indexing drive motor is engaged with the worm wheel 40.

When the coupling 35 is in an engagement position for engaging with both the fixed-side and turning-side couplings 29, 31, the turret main body 25 is positioned and fixed so that a desired tool T is located at the processing position, and cutting work is performed by the tool T at the processing position.

To index the next working tool to the processing position, the coupling 35 is advanced by an oil pressure to the engagement release position to release the engagement with both the couplings 29, 31. Consequently, the turret shaft 22 and the turret main body 25 become rotatable with respect to the quill 6, and the turret main body 25 is rotated by a rotary indexing motor to rotary index the next working tool to the processing position. When the next working tool is indexed to the processing position, the coupling 35 retracts to the engagement position by the oil pressure to be engaged with both the fixed-side and turning side couplings 29, 31. As a result, the turret main body 25 is positioned and fixed, and the next working tool performs cutting work.

The horizontal machining center 1 has a control device 60 which controls driving of the respective tool drive motors 33a to 33f and the rotary indexing mechanism 28. This control device 60 mainly has, as shown in FIG. 4(a), first and second amplifiers (drive circuits) 55, 56 which supply power to the respective tool drive motors 33a to 33f (No. 1 to No. 6), a changeover switch 57 which electrically connects or disconnects the first amplifier 55 to/from any one of the tool drive motors 33a to 33f and the second amplifier 56 to/from any one of the rest of the tool drive motors 33a to 33f respectively, and a control unit 58 which functions as a processing control unit to control driving of the first and second amplifiers 55, 56 based on a processing program code that is set in advance and to control switching of the changeover switch 57.

The control unit 58 is configured to read the contents of the processing program code in advance while operating, and retrieve the number of rotations (rotation speed) and a rotational direction of the next tool to be used to thereby control the tool. Alternatively, with data of the number, rotational direction, and rotation speed of a tool to be used being created in advance, the control unit 58 may be configured to control the tool based on that data.

Figure 4B:
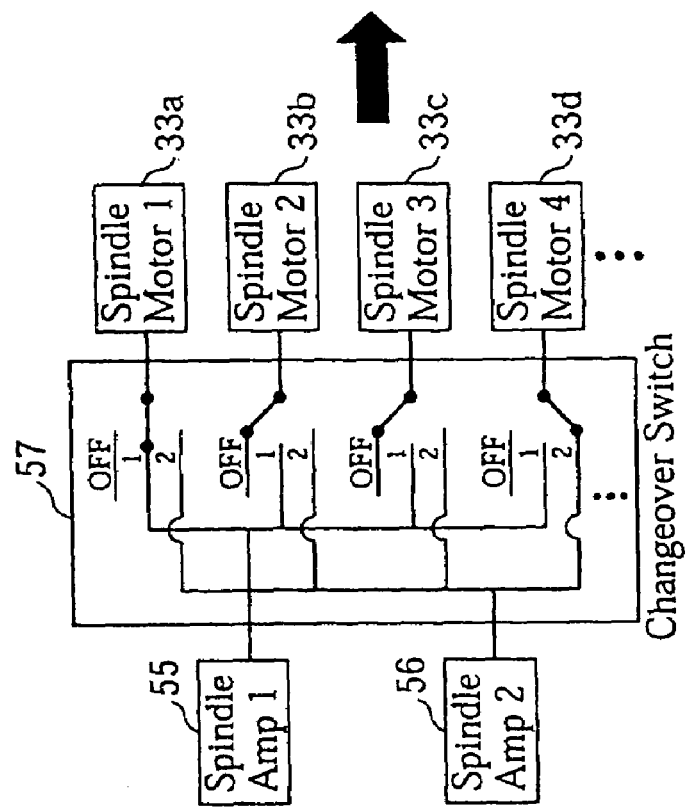
FIG. 4(a) and FIG. 4(b) are control block diagrams of the tool drive motor.
Figure 4A:
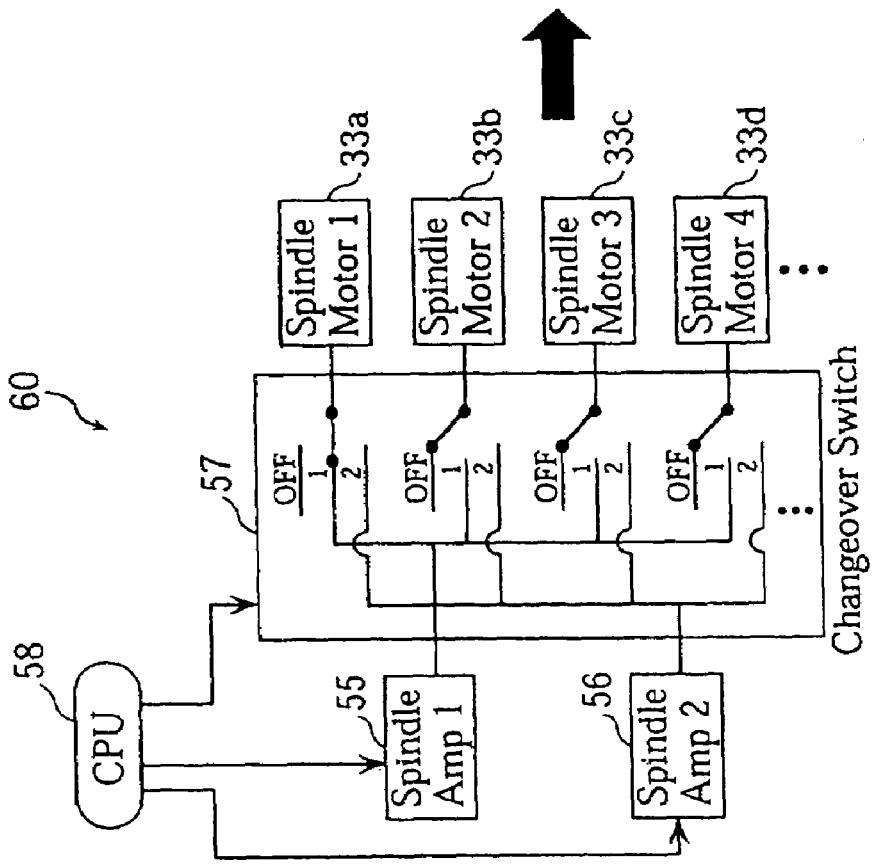
Figure 5A:
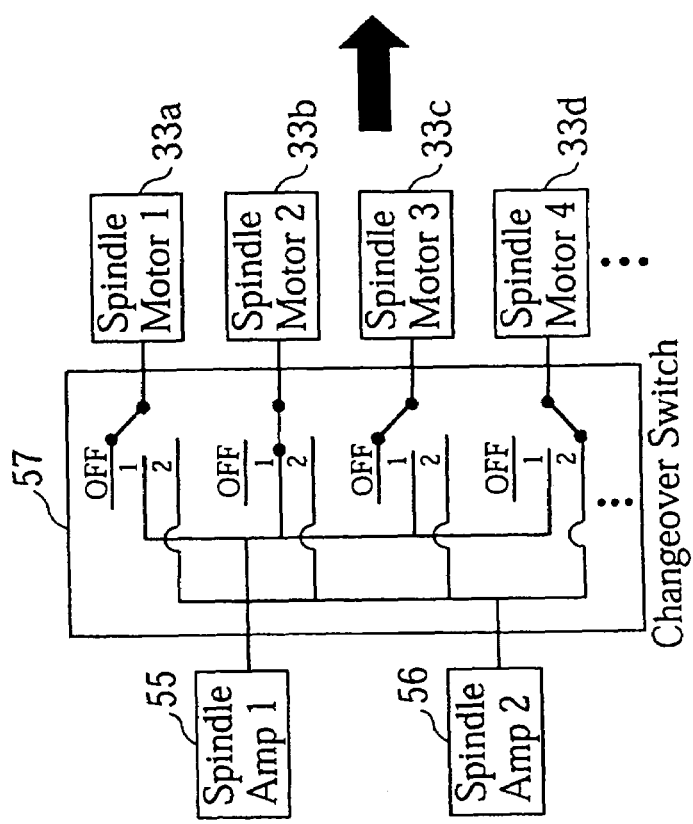
FIG. 5(a) and FIG. 5(b) are control block diagrams of the tool drive motor.
Figure 5B:
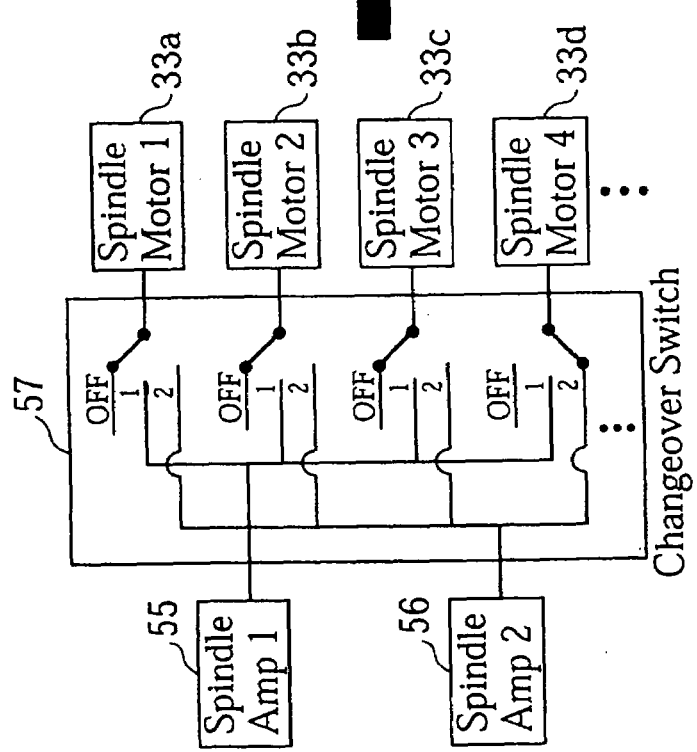
Figure 6:
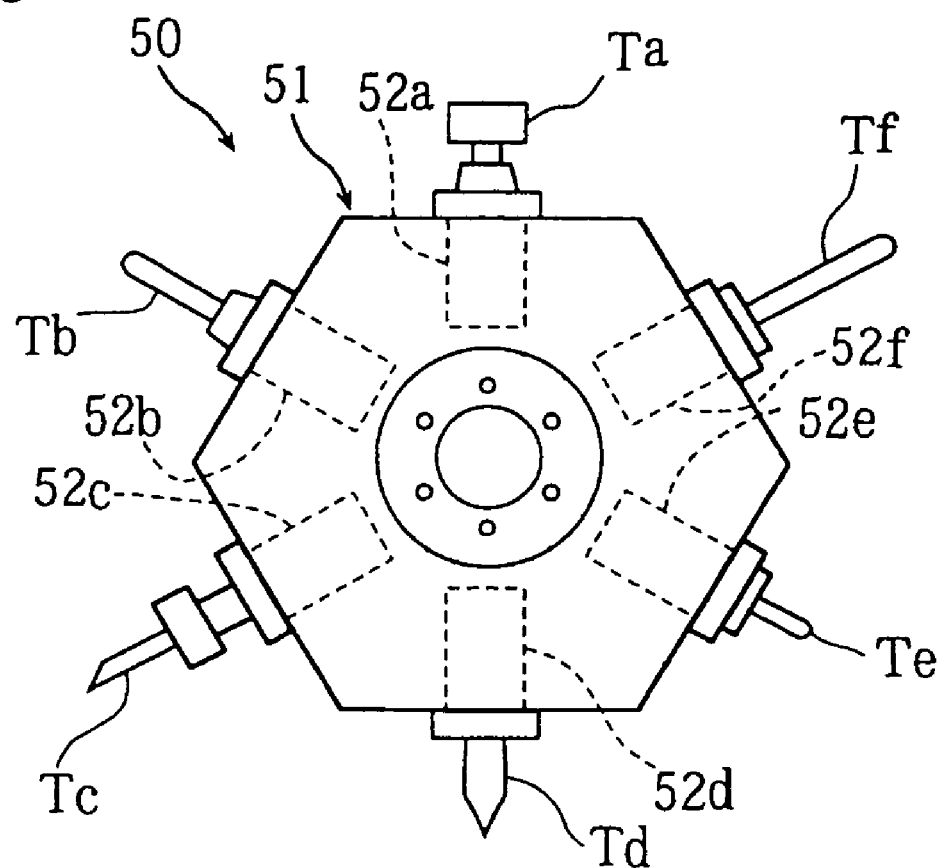
FIG. 6 is a view showing a turret head of a vertical machining center according to an embodiment other than the above embodiment.

For example, in the case where processing of a work is performed with a sequence of tools Ta, Td and Tb, the first amplifier 55 and the tool drive motor 33a are connected by the changeover switch 57, the tool drive motor 33a is rotary driven by the first amplifier 55 (refer to FIG. 4(a)), and thus the processing of the work is performed by the tool Ta of the tool drive motor 33a. While the tool drive motor 33a is rotary driven, the second amplifier 56 and the tool drive motor 33d for the next step are connected by the changeover switch 57 based on the number of rotations and a rotational direction of the next tool Td, and the tool drive motor 33d is rotary driven by the second amplifier (refer to FIG. 4(b)).

Then, the rotation speed of the tool drive motor 33d is increased to a rotation speed for processing, and when the processing by the tool drive motor 33a is completed, power supply to the tool drive motor 33a is disconnected by the changeover switch 57 to stop driving of the tool drive motor 33a. At this moment, the activated second tool drive motor 33d is rotary indexed and positioned to the processing position, and processing of the work with the tool Td of the tool drive motor 33d is performed (refer to FIG. 5(a)). While this tool drive motor 33d is rotary driven, the first amplifier 55 and the tool drive motor 33b for the next step a reconnected further by the changeover switch 57, and the tool drive motor 33b is rotary driven (refer to FIG. 5(b)) and its rotation speed is increased to the rotation speed for processing.

As described above, the control device 60 is configured such that, by sequentially switching the respective tool drive motors 33a to 33f driven by the first and second amplifiers 55, 56, the tool drive motor 33a in the processing step and the tool drive motor 33d for the next step are rotary driven, the tool drive motor 33d for the next step is rotary activated while the tool drive motor 33a in the processing step is rotary driven, the tool drive motor 33d for the next step is rotary indexed to the processing position, and the processing in the next step is performed by the tool Td for the next step on the tool drive motor 33d.

According to this embodiment, the tool drive motors 33a to 33f are provided for the tools Ta to Tf respectively, and the respective tools Ta to Tf are rotary driven by the respective tool drive motors 33a to 33f independently, so that the tool can be rotary driven directly by the tool drive motor, which eliminates the need of a driving force transmitting unit using conventional belts, gears, and so on. Therefore, the structure of the drive unit can be simplified, and the occurrence of noise and vibration can be restrained.

In this embodiment, since the tool drive motor 33d for the next step is rotary activated while the tool drive motor 33a in the processing step is rotary driven, and the tool Td for the next step on the tool drive motor 33d is indexed to the processing position to perform the processing in the next step, the next processing can be started substantially at the same time when the tool Td for the next step is indexed to the processing position. Therefore, the loss until the start of processing with the tool Td for the next step can be eliminated, and the processing time can be shortened accordingly.

Moreover, since the rotation speed of the tool drive motor 33d for the next step is increased to the rotation speed for processing, the processing time can be shortened further.

In this embodiment, since the tool drive motor 33a in the processing step and the tool drive motor 33d for the next step are rotary driven by sequentially switching the respective tool drive motors 33a to 33f driven by the first and second amplifiers 55, 56, sequential processing can be performed only by the two amplifiers 55, 56 which drive the tool drive motor 33a in the processing step and the tool drive motor 33d for the next step, and thus the cost can be reduced as compared to the case where the amplifier is provided for each drive motor.

It should be noted that, although the horizontal machining center has been described as an example in the embodiment, the present invention can also be applied to a vertical machining center 50 with a hexagonal turret head 51 to which plural tools Ta to Tf are arranged to form a radial pattern in an orthogonal direction with respect to the quill axis. In this case, by providing the tool drive motors 52a to 52f to the tools Ta to Tf respectively, the same effect as that of the above-described embodiment can be obtained.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A machining center comprising:
   a turret head with a plurality of tools;
   a tool drive motor for each tool, said tool drive motor rotary driving the corresponding tool independently; and a processing control means for controlling a first tool drive motor to rotary drive a first tool for processing a workpiece, the processing control means also controlling a second tool drive motor to rotary drive a second tool while the first tool is still processing the workpiece, and the processing control means indexing the turret head to position the second tool at a processing position once the processing by the first tool is completed, wherein said processing control means controls a rotation speed of the second tool to reach a rotation speed for processing a workpiece while the first tool is being rotary driven during processing a portion of the workpiece.

2. The machining center according to claim 1, wherein said processing control means maintains the rotation speed of the second tool at the rotation speed for processing the workpiece while indexing the turret head to position the second tool at the processing position.

3. A machining center comprising:

a turret head with a plurality of tools;

a tool drive motor for each tool, said tool drive motor rotary driving the corresponding tool independently; and a first drive circuit for rotary driving a first tool drive motor;

a second drive circuit for rotary driving a second tool drive motor; and a processing control unit for rotary driving a tool drive motor in a processing step and a tool drive motor for a next step by sequentially switching said tool drive motors driven by said first and second drive circuits, wherein said processing control unit controls a rotation speed of the second tool to reach a rotation speed for processing a workpiece while the first tool is being rotary driven during processing a portion of the workpiece.

4. The machining center according to claim 3, wherein said processing control unit maintains the rotation speed of the second tool at the rotation speed for processing the workpiece while indexing the turret head to position the second tool at the processing position.

5. A method for operating a machining center including a turret head with a plurality of tools and a tool drive motor for each tool, said tool drive motor rotary driving the corresponding tool independently, comprising the steps of:

rotating a first tool by a first tool drive motor and processing a portion of a workpiece using the first tool;

rotating a second tool by a second tool drive motor during said step of processing a portion of the workpiece;

controlling a rotation speed of the second tool to reach a rotation speed for processing the workpiece during said step of processing a portion of the workpiece; and indexing the turret head to position the second tool at a processing position following completion of said step of processing a portion of the workpiece.

6. The method for operating a machining center according to claim 5, further comprising the steps of:

controlling a first drive circuit to control said step of rotating the first tool;

controlling a second drive circuit to control said step of rotating the second tool; and sequentially switching a first tool drive motor and a second tool drive motor by said first and second drive circuits.

7. The method for operating a machining center according to claim 5, wherein said step of indexing includes maintaining the rotation speed of the second tool at the rotation speed for processing the workpiece during the positioning of the second tool at the processing position.

* * * * *